Figure 1:
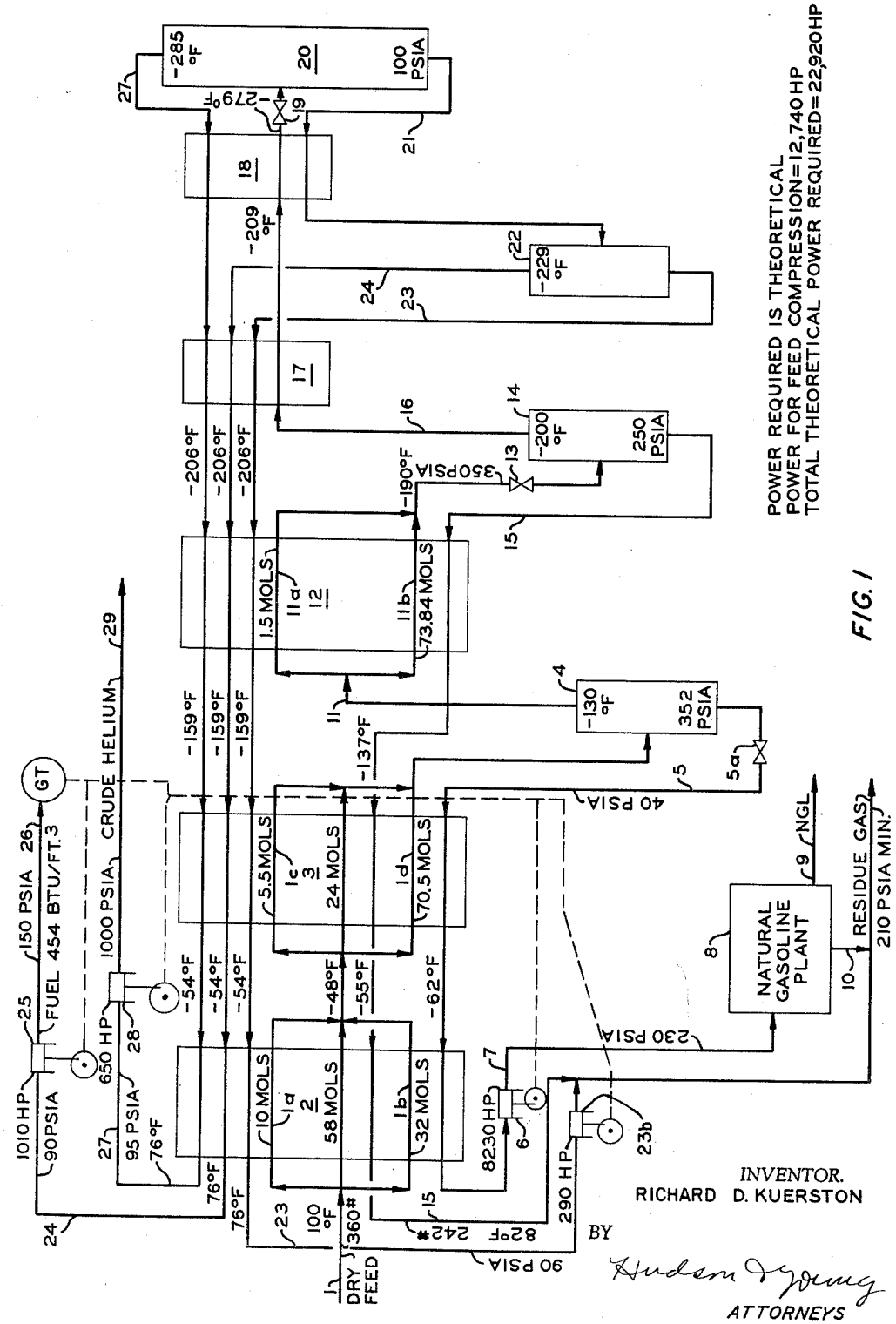

May 4, 1965

R. D. KUERSTON 3,181,307

HELIUM SEPARATION

Filed Feb. 16, 1960

3 Sheets-Sheet 3

POWER REQUIRED IS THEORETICAL
POWER FOR FEED COMPRESSION = 10,250 HP
TOTAL THEORETICAL POWER = 28,740 HP

INVENTOR.
RICHARD D. KUERSTON

BY
Hudson & Young
ATTORNEYS

United States Patent Office 3,181,307
Patented May 4, 1965

3,181,307
HELIUM SEPARATION
Richard D. Kuerston, Bartlesville, Okla., assignor to Phillips Petroleum Company, a corporation of Delaware
Filed Feb. 16, 1960, Ser. No. 9,091
15 Claims. (Cl. 62—23)

This invention relates to the separation and recovery of helium. It also relates to the separation and recovery of fuel gas from natural gas which may contain helium in recoverable amounts. It also relates to improved recovery of natural gas liquids from natural gas. In one of its aspects, the invention relates to a multi-stage, refrigeration, condensation, and separation method for the recovery of a helium concentrate from a natural gas. In another of its aspects, it relates to the recovery of at least one fuel gas from a natural gas, the fuel gas being characterized by a content of nitrogen such that the fuel can be utilized as fuel in the system, materially reducing the air compression power requirement, the method involving a combination of refrigeration, condensation, and vaporization steps including the separation of natural gas liquids. In a further aspect of the invention, it relates to an improved recovery of natural gas liquids, especially as this operation is effected in a method for the recovery of a helium concentrate by a combination of refrigeration, condensation, and vapor separation steps. In one embodiment of the invention, a natural gas is refrigerated under pressure, natural gas liquids are separated therefrom, uncondensed gas is further refrigerated, expanded, and separated into a then existing liquid phase removed as a residue gas and a gas phase, which upon further refrigeration and expansion, results in a gas phase helium concentrate and a liquid phase, which upon some warming, produces a gas phase removed as a desirable nitrogen-containing fuel gas and a liquid phase, which upon further warming, is removed as a residue gas, several heat exchange steps being involved, which in combination, are to be viewed as a still further aspect of the invention as embodied in the steps here presented. In a further embodiment of the invention, a natural gas is refrigerated under pressure, obtaining a liquid phase containing natural gas liquids which are separated, the remaining gases, which are still uncondensed, are further refrigerated and expanded, forming a liquid phase, which after some heat exchange to warm the same, results in a further liquid phase removed as a residue gas from the system and a vapor phase, which is a fuel gas containing nitrogen, which can be used in the system, as can any of the fuel gas recovered in this invention, the gas phase, after some expansion, being further refrigerated and separated into a liquid phase, which after heat exchange forms additional fuel gas according to the invention and a final gas phase which is a helium concentrate, the combination of the several steps including the arrangement of heat exchangers as well as supplying refrigeration, preceding the formation of the helium concentrate gas phase, being viewed as additional inventive aspects of the method here set out.

In a further embodiment of the invention it relates to the refrigeration of natural gas with separation of natural gas liquids, further refrigerating and expanding still uncondensed gases to form a liquid phase, which after some warming is separated into a nitrogen-containing fuel gas according to the invention, and a residue gas, which after heat exchange is removed from the system, gas formed by the expansion being further refrigerated and further separated into a liquid phase, which after warming through heat exchange is removed as further residue gas and the gas phase remaining in a separation zone, in which the last-mentioned residue gas is removed, being refrigerated therein, preferably by external refrigeration, to produce additional fuel gas which, after heat exchange as described herein, is recovered from the method, leaving in said separation zone, from which it is removed as a product, a helium concentrate.

The recovery of helium from natural gas, the beneficiation of natural gas to recover natural gas liquids therefrom, for example, constituents of natural gasoline or other hydrocarbons and the recovery of fractions of natural gas suitable for use as a fuel to provide power requirements will be, each of them, severally and in combination, each with at least one of the other two, involved in the several steps of the invention as conceived and/or arranged in the descriptions which follow. The engineering design, which results in a plant leading to improved recoveries of various streams, particularly in a well worked art, must be based upon novel concepts which are not apparent until conceived. Thus, while in the invention which follows, one skilled in the art will recognize heat exchangers, gas and liquid separators, pumps or compressors, etc., he will also recognize that there are involved unobvious combinations which are based upon concepts which are unsuggested by the art known to this inventor. Therefore, underlying the particular and specific arrangements are concepts of the recovery of a fuel gas within the system as well as the recovery on an improved basis of natural gas liquids which are, all of them, to be viewed as presenting new, useful, and unobvious combinations or steps in an art or in arts which are highly developed as known today.

It is an object of this invention to recover helium from natural gas. It is also an object of this invention to recover a nitrogen-containing fuel from a natural gas. A further object of this invention is to so treat a natural gas that increased recovery of natural gas liquids or constituents is realized. It is a further object of the invention to provide an operation in which a helium concentrate is recovered and in which power savings are effected by recovering at least one nitrogen-containing fuel gas. It is a further object of the invention to so recover helium and/or a fuel gas from natural gas that improved separation of natural gas liquids is obtained.

Other aspects, objects, and the several advantages of the invention are apparent from a study of the disclosure, the drawings, and the appended claims.

According to the present invention, helium is recovered from natural gas by a combination of refrigeration, heat exchange, and gas and liquid separation steps comprising in the combination, at least one step in which a nitrogen-rich, methane-containing fuel gas is recovered which can be utilized to supply at least a portion of the power required in the overall operation.

In the descriptions which follow, certain equipment or other means or steps which one skilled in the art in possession of this disclosure will routinely supply have been omitted for sake of simplicity. In its broadest concepts, and, therefore, within the various scopes of coverage, the claims include some variation and modification which can be made without abandoning the several aspects or combinations of the invention.

Figure 2:
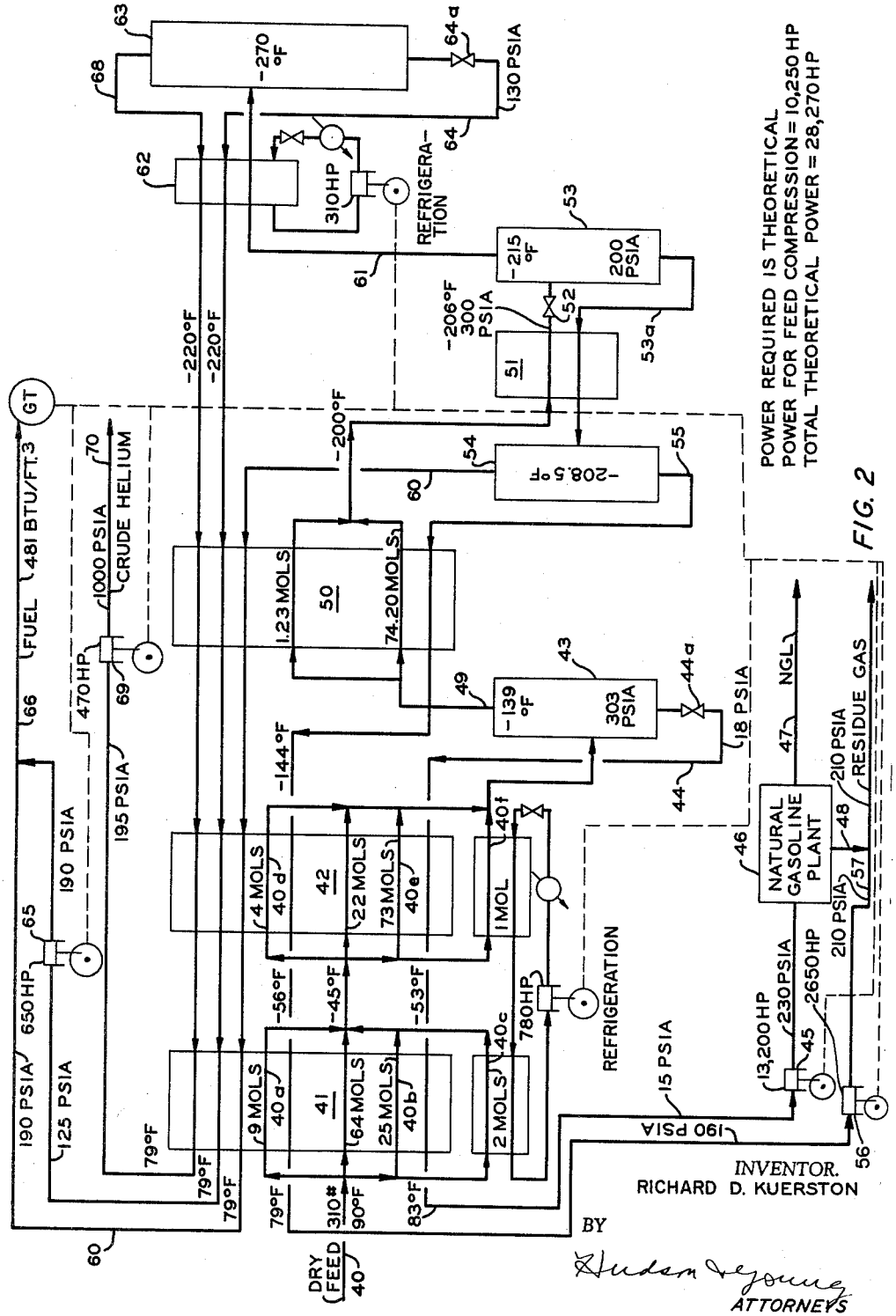
Figure 3:
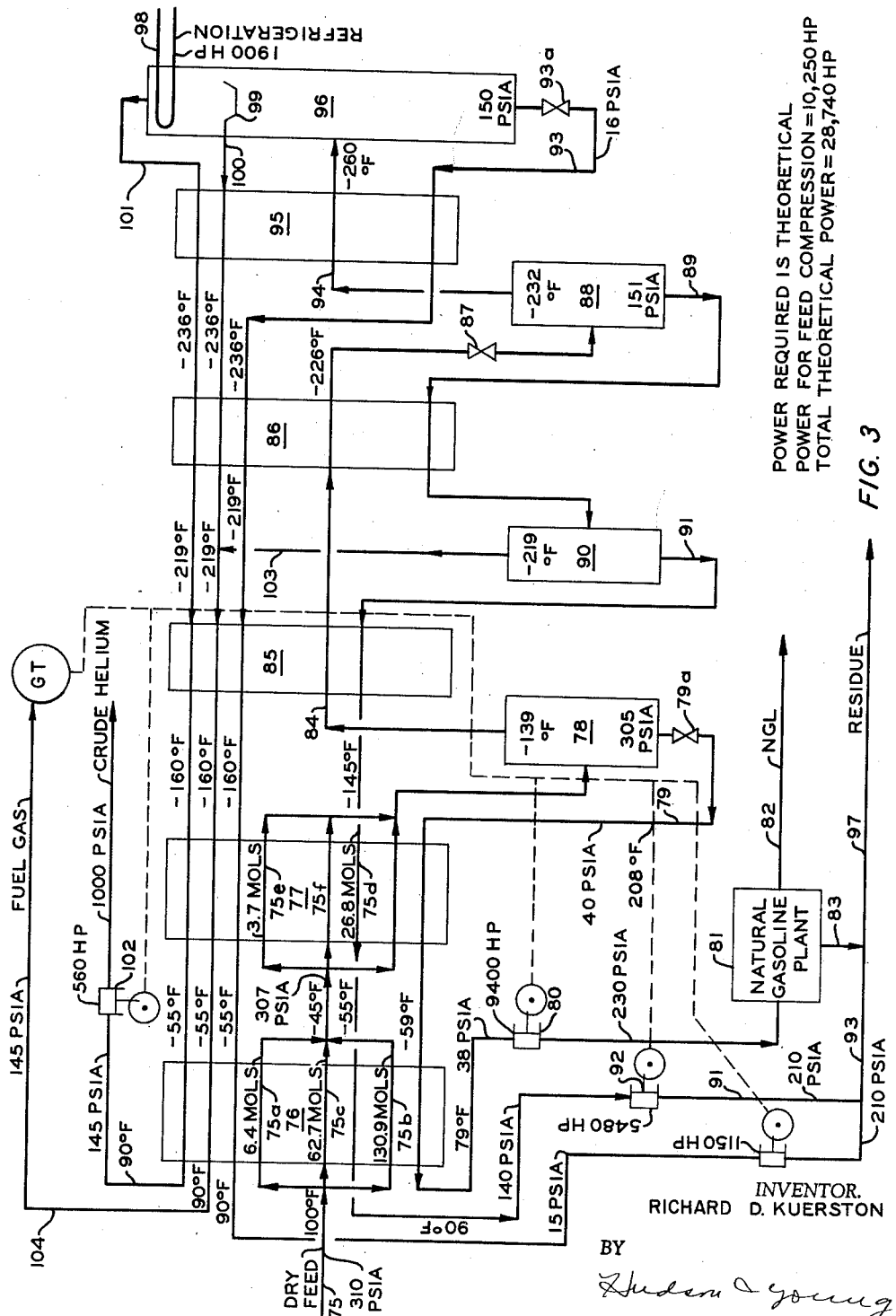

Referring now to the drawings, there are illustrated diagrammatically three combinations or layouts of steps involving heat exchange and partial condensation and evaporation which, according to the invention, supply a highly desirable helium concentrate which can contain a preponderant proportion of helium as is evident from the tables associated with each figure and at least one gas which can contain a preponderance of nitrogen yet contains a substantial proportion of methane, rendering it advantageously useful in the operation of a gas turbine as a fuel gas, minimizing the requirement to compress air and, therefore, the horsepower requirements of the operation. In FIGURE 1, the fuel gas is separated by partial evaporation of a liquid product which remains upon separation in a separator of said helium concentrate. In FIGURE 2, the fuel gas is obtained at least in part by ultimately vaporizing the liquid which remains upon separation of the helium concentrate of that figure and at least in part by evaporating a stream quite rich in methane which is obtained in a gas separation which precedes that in which the helium concentrate is obtained. In FIGURE 3, the fuel gas is obtained in part by a partial condensation of the helium concentrate, thus obtaining the desired helium concentrate and the fuel gas in this partial condensation step, and in part by partial evaporation of condensed gases separated from the feed gas at an intermediate point in the process.

In following the description of the several drawings, it should be borne in mind that the saving in horsepower resulting in each of the combinations of the invention, as illustrated in the drawings, is due to the fact that less excess air, that is, air beyond that required for fuel combustion need be compressed and fed to the modified power source, for example, a gas turbine, for the purpose of maintaining combustion temperatures below a reasonable upper limit. One mole of methane requires for theoretically complete combustion 10 mols of air. However, 60 mols of air per mol of methane have generally been supplied to keep combustion temperatures below said reasonable upper limit or at least no higher than said limit. Thus, by using a fuel gas of the invention, which is obtained according to the invention, containing 1 mol of nitrogen per mol of methane or even more nitrogen than methane it is obvious that less air will need to be compressed to supply said excess air needed primarily for cooling purposes. Thus, the more nitrogen present in the methane the less air that must be compressed and, therefore, the greater the power savings. Ideally, the fuel gas would contain considerably more nitrogen and less methane than in the examples. This fuel gas can be produced by the methods of the invention, if desired. However, at present writing, it is preferred for reasons of optimum operation of the specific combinations illustrated to recover the proportion of nitrogen as indicated.

It will be noted that the invention deviates from the conventional helium extraction process by producing a nitrogen-methane product stream which can be used as a fuel anywhere but which, according to the invention, is advantageously used as fuel in gas turbines which power the entire helium extraction plant, permitting the use of natural gas or other locally obtained hydrocarbon streams as fuel for the gas turbines because the natural gas, when treated according to the invention, will provide the high nitrogen proportion in the fuel gas.

It so happens that nitrogen is more volatile than methane and the vapor which is obtained upon evaporation of condensed natural gas will be richer in nitrogen than methane so that by controlling the amount of liquid vaporized, the composition of the nitrogen-methane vapor can be controlled to produce a fuel which is optimum for a gas turbine under any specific conditions. Also, according to the invention, though not illustrated completely in the drawing for sake of simplicity, for following and understanding the same, there is provided the more specific combination of the removal of nitrogen by way of a nitrogen-methane fuel gas from the natural gas stream which makes possible more complete and easier recovery of heavier hydrocarbons such as propane and butane from a methane-rich stream in a later oil absorption separation step. Thus, it is an important feature of this invention that it permits among other advantages, the recovery of more natural gas liquids from natural gas. Thus, because nitrogen has no heating value and ordinarily it would be necessary to retain enough propane and butane, etc., in the residue gas to satisfy or to provide a heating value of the gas, it will be seen that the removal of substantial nitrogen considerably reduces the necessity and, therefore, permits increased recovery of said liquids. In addition, oil absorption separation equipment operates much more efficiently in removing propane, butane, and heavier hydrocarbons when the feed natural gas contains a minimum of nitrogen.

Also, viewing the drawings, it should be noted that removing the fuel gas according to the several embodiments of the invention is accomplished by simple phase separation in a simple vessel and, therefore, in an inexpensive way.

In the drawings, "GT" denotes a gas turbine. The dashed lines indicate a direct drive through a gear reduction box connecting the gas turbine to the various compressors. Of course, if desired, other means, known to one versed in the art, can be employed to convert the energy of the fuel gas to mechanical, electrical, or heat energy for use in the method of the invention.

Referring now to the drawings, in FIGURE 1 a natural gas feed containing principally helium, nitrogen, methane, ethane, and propane is conducted by pipe 1 through heat exchangers 2 and 3 into phase separator 4. For sake of illustrating the invention and the respective heat exchangers, as one skilled in the art will appreciate, pipe 1 is shown with branch circuits 1a, 1b, 1c, and 1d. These branch circuits make it possible diagrammatically to show all of the heat exchangers through which the feed is put before it reaches separator 4 at a temperature of −130° F., having been cooled to this temperature by streams leaving the operation as later described. Liquid from separator 4 is passed through expansion valve 5a into pipe 5 and then through heat exchangers 3 and 2 for heat exchange with incoming feed and then by compressor 6 and pipe 7 into natural gasoline plant 8, from which liquid propane and higher boiling natural gas liquid is removed by pipe 9, while residue gas is removed by pipe 10. Returning to separator 4, gas phase passes by pipe 11 through branch pipes 11a and 11b through heat exchanger 12, then through expansion valve 13 into separator 14. Liquid phase from separator 14 is passed by pipe 15, heat exchangers 12, 3, and 2 for heat exchange with the gas phase from separator 4 and with incoming feed passing ultimately by pipe 15 from the system together with residue gas from pipe 10, as earlier described. The composition of the residue gas is given in the column entitled "R.G." in Table I. Gas phase separated in separator 14 passes by pipe 16 through heat exchangers 17 and 18 and expansion valve 19 into phase separator 20. Liquid phase from separator 20 passes by pipe 21 through heat exchanger 18 into phase separator 22 in which the liquid phase, having been heat exchanged with stream 16 and, therefore, partially vaporized in heat exchanger 18, is subjected to a phase separation step resulting in a further liquid phase, which after heat exchange to yield its refrigeration value in heat exchangers 17, 12, 3 and 2, is passed by pipe 23, through compressor 23b into pipe 15 as part of the residue gas of the system. Gas phase from separator 22 passes by pipe 24 through heat exchangers 17, 12, 3 and 2 and through compressor 25, which delivers the same under conditions for use as a fuel by pipe 26.

Returning now to phase separator 20, crude helium passes by pipe 27 through heat exchangers 18, 17, 12, 3 and 2, compressor 28, and pipe 29 as the helium concentrate of this embodiment of the invention. Table I below presents a material balance and power requirements for the embodiment shown in FIGURE 1. As indicated in the table, by practice of this invention, there is a saving of 1,700 H.P. for recovery of the helium concentrate over the recovery of the same concentrate in the absence of the invention.

TABLE I

*Material balance and actual power requirements for FIGURE 1*

[Basis: 100 mols of feed gas]

| Stream No | 1 | 5 | 11 | 27 | 15 | 24 | 23 | 16 | 21 | R.G. | 9 |
|---|---|---|---|---|---|---|---|---|---|---|---|
| Helium, mols | 0.75 | 0.00 | 0.75 | 0.73 | 0.02 | 0.00 | 0.00 | 0.73 | | 0.02 | |
| Nitrogen, mols | 14.84 | 0.67 | 14.17 | 0.53 | 8.29 | 5.18 | 0.17 | 5.88 | 5.35 | 9.13 | |
| Methane, mols | 71.72 | 13.51 | 58.21 | 0.12 | 52.35 | 4.22 | 1.52 | 5.86 | 5.74 | 67.38 | |
| Ethane, mols | 6.19 | 4.43 | 1.76 | | 1.65 | 0.01 | 0.10 | 0.11 | 0.11 | 6.18 | |
| Propane+ mols | 6.50 | 6.05 | 0.45 | | 0.45 | | | | | 1.36 | 5.14 |
| | 100.00 | 24.66 | 75.34 | 1.38 | 62.76 | 9.41 | 1.79 | 12.58 | 11.20 | 84.07 | 5.14 |

H.P.
Total Power Requirement, assuming 15 percent engine efficiency, without invention _____ 154,500
Total Power Requirement, assuming 15 percent engine efficiency, with invention _____ 152,800

H.P. Saving _____ 1,700

Referring now to FIGURE 2, feed as before is passed by pipe 40 and branch pipes 40a, 40b, 40c and branch pipes 40d, 40e and 40f, as explained in connection with FIGURE 1, through heat exchangers 41 and 42, respectively, into phase separator 43. Liquid separating in separator 43 is removed by expansion valve 44a into pipe 44 and passed through heat exchangers 42 and 41 and compressed by 45 into natural gasoline plant 46, from which natural gas liquids are removed by pipe 47. Residue gas from plant 46 passes out by pipe 48.

A refrigeration cycle is shown diagrammatically to remove additional heat from heat exchanger 41 and heat exchanger 42. This cycle makes additional savings possible in the system.

Returning to separator 43, overhead is removed by pipe 49, passed through heat exchangers 50 and 51 for additional cooling and then is passed by expansion valve 52 into phase separator 53. Liquid phase from separator 53 passes by pipe 53a through heat exchanger 51 into separator 54, from which liquid is passed by pipe 55 through heat exchangers 50, 42 and 41, compressor 56, and pipe 57 as residue gas from the process together with gas in pipe 48, obtained as earlier described. Composition of the residue gas from the process is given in the column entitled "R.G." of Table II below.

Overhead from phase separator 54 passes by pipe 60 through heat exchangers 50, 42 and 41 and is at least a portion of the fuel gas recovered in the system according to the invention.

Returning now to separator 53, the second separator from the right-hand end of the drawing, uncondensed gases are passed by pipe 61 through heat exchanger 62 into separator 63, from which liquid phase is passed by expansion valves 64a into pipe 64 through heat exchangers 62, 50, 42 and 41 and compressor 65 as additional fuel gas recovered in the system according to the invention. This gas is combined with the gas in pipe 60 and has the final composition indicated by stream 66 in Table II below.

Additional refrigeration as indicated by the refrigeration cycle including heat exchanger 62 is furnished at heat exchanger 62 to the stream in pipe 61.

Returning to separator 63, overhead 68 is passed through heat exchangers 62, 50, 42 and 41 and by compressor 69 and pipe 70 as the crude helium product of the process.

Table II below presents power requirements and a material balance for the embodiment of FIGURE 2.

TABLE II

*Material balance and actual power requirements for FIGURE 2*

[Basis: 100 moles of feed gas]

| Stream No | 40 | 44 | 49 | 61 | 53A | 60 | 55 | R.G. | 47 | 68 | 64 | 66 |
|---|---|---|---|---|---|---|---|---|---|---|---|---|
| Helium, mols | 0.75 | 0.00 | 0.75 | 0.73 | 0.02 | 0.02 | 0.00 | 0.00 | | 0.73 | 0.00 | 0.02 |
| Nitrogen, mols | 14.84 | 0.61 | 14.23 | 4.03 | 10.20 | 1.16 | 9.04 | 9.65 | | 0.55 | 3.48 | 4.64 |
| Methane, mols | 71.72 | 13.19 | 58.53 | 3.23 | 55.30 | 1.13 | 54.07 | 67.36 | | 0.14 | 3.09 | 4.22 |
| Ethane, mols | 6.19 | 4.67 | 1.52 | | 1.52 | | 1.52 | 6.19 | | | | |
| Propane+ mols | 6.50 | 6.10 | 0.40 | | 0.40 | | 0.40 | 1.69 | 4.81 | | | |
| | 100.00 | 24.57 | 75.43 | 7.99 | 67.44 | 2.31 | 65.13 | 84.89 | 4.81 | 1.42 | 6.57 | 8.88 |

H.P.
Total Power Required (15% Eff.), without invention _____ 190,900
Total Power Required (15% Eff.), with invention _____ 188,800

Save _____ 2,100

Referring now to FIGURE 3, natural gas feed passes through pipe 75 having branched pipes 75a, 75b, 75c, 75d, 75e and 75f, in heat exchangers 76 and 77 into gas separator 78, from which a liquid phase is passed by expansion valve 79a into pipe 79, heat exchangers 77 and 76 and compressor 80 to natural gasoline plant 81, from which natural gas liquids are removed by pipe 82, and residue gas is removed by pipe 83. Uncondensed overhead from separator 78 is passed by pipe 84 through heat exchangers 85 and 86 and expansion valve 87 into separator 88. A liquid phase is removed from separator 88 by pipe 89 through heat exchanger 86 into phase separator 90, from which residual liquid is passed by pipe 91 through heat exchangers 85, 77 and 76, and compressed by 92 into residue gas line 93.

Returning to separator 88, overhead is passed by pipe 94 through heat exchanger 95 into phase separator 96. A residue gas, in liquid phase, is removed by expansion valve 93a into pipe 93 and together with the gases in 91 and 83 form residue gas which is removed from the system at 97, the analysis of which is given in the column entitled "R.G." in Table III below.

Returning to separator 96, there is provided therein in the portion normally occupied by gas phase, a refrigeration source 98, below which is provided a trap out tray or means 99. Conditions being adapted and the tray and refrigeration means being so positioned that there is accumulated on and withdrawn from this tray stream 100 a nitrogen-rich fuel gas, according to the invention, which is passed by heat exchangers 95, 86, 85, 77 and 76 to utilization as a fuel gas which according to the invention can be used within the system to supply power requirements and power savings as indicated. Finally, there is removed overhead from separator 96 through pipe 101, the helium concentrate of the invention which is compressed by 102 to storage or elsewhere, as desired.

As another or alternative source of fuel for the system or for use elsewhere, there is taken overhead from separator 90 by pipe 103 an additional fuel gas which is added to that in pipe 100, containing a very highly desirable ratio of nitrogen to methane.

Table III below presents a material balance and power requirements for the embodiment of FIGURE 3.

TABLE III

*Material balance and actual power requirements for FIGURE 3*

[Basis: 100 moles of feed gas]

| Stream No. | 75 | 79 | 84 | 94 | 89 | 101 | 93 | 100 | 91 | 103 | 82 | R.G. | 104 |
|---|---|---|---|---|---|---|---|---|---|---|---|---|---|
| Helium, mols | 0.75 | 0.00 | 0.75 | 0.73 | 0.02 | 0.73 | 0.00 | 0.00 | 0.00 | 0.02 | | 0 | 0.02 |
| Nitrogen, mols | 14.84 | 0.61 | 14.23 | 2.73 | 11.50 | 0.57 | 1.04 | 1.12 | 7.13 | 4.37 | | 8.78 | 5.49 |
| Methane, mols | 71.72 | 13.19 | 58.53 | 1.48 | 57.05 | 0.03 | 1.22 | 0.23 | 54.42 | 2.63 | | 68.83 | 2.86 |
| Ethane, mols | 6.19 | 4.67 | 1.52 | | 1.52 | | | | 1.52 | | | 6.19 | |
| Propane+mols | 6.50 | 6.10 | 0.40 | | 0.40 | | | | 0.40 | | 5.11 | 1.39 | |
| | 100.00 | 24.57 | 75.43 | 4.94 | 70.49 | 1.33 | 2.26 | 1.35 | 63.47 | 7.02 | 5.11 | 85.19 | 8.37 |

H.P.
Actual Power Required (15% Eff.) without invention _____ 193,700
Actual Power Required (15% Eff.) with invention _____ 191,600

Saving _____ 2,100

One skilled in the art, having carefully studied this disclosure, will have realized that the invention as earlier stated possesses several aspects, among which are included the recovery of helium, the preparation of a fuel gas and the improved recovery of natural gas liquids or components and that in each recovery there are the concomitant advantages which have been discussed and all of which are apparent from a study of this disclosure in the light of known art.

The concept to recover an additional fuel stream or streams according to this invention is highly advantageous since liquid fuel gas leaving the helium recovery unit will have a higher nitrogen content than it would have if all of the fuel were taken from this source because the less gas condensed in the helium recovery unit to form fuel gas the greater will be its nitrogen content. Thus, the less fuel taken from the additional fuel stream the higher its nitrogen content will be.

In the invention, the natural gas liquids recovery is limited substantially only by the required heating value of the residue gas.

Reasonable variation and modification are possible within the scope of the foregoing disclosure, and drawings, and the appended claims to the invention the essence of which is that there have been provided several combinations for the recovery of helium, a fuel gas and natural gas liquids from natural gas based at least in part upon the concept that fuel gas can be recovered in the method which can be utilized to supply at least a portion of the power requirements of the method.

I claim:
1. A method for the recovery of helium from natural gas which comprises the following sequence of steps:
    (1) refrigerating under pressure, a natural gas feed containing helium, nitrogen, and methane, and heavier hydrocarbons,
    (2) removing from the refrigerated gas as a liquid a portion of methane and a substantial portion of hydrocarbons heavier than methane,
    (3) further refrigerating the still uncondensed gases thus obtained,
    (4) expanding the further refrigerated gases to a lower pressure, obtaining a liquid containing a large preponderant proportion of methane and a small percentage of higher boiling hydrocarbon,
    (5) separating the last obtained liquid from the refrigerated gas,
    (6) further refrigerating said gases,
    (7) expanding said further refrigerated gases, obtaining a liquid phase containing at least about 50% nitrogen, up to about 50% methane, and a very small percentage of higher boiling hydrocarbon and a gas phase containing helium, nitrogen, and a very small percentage of methane,
    (8) separating said liquid phase from said gas phase and recovering said gas phase as a helium concentrate product of the method, and
    (9) utilizing the liquid phase obtained in step (7) as a combustible gas fuel for an internal combustion power plant used to power the operation whereby the nitrogen portion of said liquid phase serves as a non-combustible gas for preventing overheating of said power plant.

2. A method according to claim 1 wherein the feed is initially compressed and all of the refrigeration requirements of the several refrigeration steps practiced are met by the arrangement of the several heat exchanges described.

3. A method for the recovery of helium from natural gas which comprises the following sequence of steps:
    (1) refrigerating under pressure, a natural gas feed containing helium, nitrogen, and methane, and heavier hydrocarbons,
    (2) removing from the refrigerated gas as a liquid a portion of methane and a substantial portion of hydrocarbons heavier than methane,
    (3) heat exchanging said hydrocarbons heavier than methane with incoming feed,
    (4) further refrigerating the still uncondensed gases thus obtained,
    (5) expanding the further refrigerated gases to a lower pressure, obtaining a liquid containing a large, preponderant proportion of methane and a small percentage of higher boiling hydrocarbon and yet uncondensed gases,
    (6) separating the last obtained liquid from the refrigerated gas,
    (7) heat exchanging said last separated, last obtained liquid with said still uncondensed gases,
    (8) then separating, from said last separated, last obtained liquid, a gas phase containing at least about 50% nitrogen and up to about 50% methane, suitable for use as a fuel, obtaining a liquid phase,
    (9) then heat exchanging said liquid phase with said still uncondensed gases, before said still uncondensed gases are heat exchanged with said last separated, last obtained liquid,

(10) then heat exchanging said last liquid phase with incoming feed,
(11) further refrigerating the yet uncondensed gases, employing some external refrigeration,
(12) passing said further refrigerated gases of step (11) into a separation zone, and thus obtaining a liquid phase containing at least about 50% nitrogen and up to about 50% methane and a gas phase containing helium, nitrogen, and a minor proportion of methane,
(13) heat exchanging said gas phase with said yet uncondensed gases, then with said still uncondensed gases and then with incoming feed,
(14) recovering the thus used, last mentioned gas phase as a helium concentrate product of the method,
(15) and adding external refrigeration to the heat exchange of said hydrocarbons heavier than methane with incoming feed.

4. A method according to claim 3 wherein the last obtained liquid phase is heat exchanged with the yet uncondensed gases then with the still uncondensed gases, before said still uncondensed gases are heat exchanged with said last separated last obtained liquid, then heat exchanging said last obtained liquid phase with incoming feed and recovering said thus used, last obtained liquid phase which has been substantially heated as a fuel gas.

5. A method for the recovery of helium from natural gas which comprises the following sequence of steps:
(1) refrigerating under pressure, a natural gas feed containing helium, nitrogen, and methane, and heavier hydrocarbons,
(2) removing from the refrigerated gas as a liquid a portion of methane and a substantial portion of hydrocarbons heavier than methane,
(3) heat exchanging said liquid with incoming feed,
(4) further refrigerating the still uncondensed gases,
(5) expanding the further refrigerated gases to a lower pressure, obtaining a liquid containing a large, preponderant proportion of methane and a small percentage of higher boiling hydrocarbon,
(6) separating the last obtained liquid from the refrigerated gas,
(7) heat exchanging the last obtained liquid with the still uncondensed gases before these gases are expanded forming a gas phase containing a large, preponderant proportion of nitrogen and a minor yet substantial proportion of methane and a liquid phase containing a large, preponderant proportion of methane and nitrogen as well as a small percentage of higher boiling hydrocarbons,
(8) separating said last mentioned gas phase, heat exchanging said last-mentioned gas phase with the still uncondensed gases before the still uncondensed gases are heat exchanged just prior to their expansion as herein set forth, then heat exchanging said last mentioned gas phase with incoming feed and recovering a gas suitable as a fuel for the method of recovery here described,
(9) recovering said last mentioned liquid phase and heat exchanging the same with said still uncondensed gases as these gases are obtained after the first liquid separation therefrom, and then heat exchanging said liquid phase with incoming feed to the method, and
(10) utilizing the said gas suitable for fuel obtained in step (8) in an internal combustion power plant requiring additional non-combustible gas over and above that required for combustion to prevent overheating said power plant, as a fuel containing at least a portion of the said non-combustible gas.

6. A method according to claim 5 wherein the fuel gas which is recovered and which is suitable for use in the method of recovery is used therein to provide at least a portion of the power required to accomplish said method.

7. In a process for the recovery of helium from a nitrogen containing natural gas the steps of:
(a) Utilizing some of the products of the process in an internal combustion power plant to power the said process,
(b) Supplying combustion air and additional non-combustible gas to said power plant, said non-combustible gas being over and above that required for combustion so as to prevent overheating of the said power plant,
(c) Supplying at least a portion of the said non-combustible gas by separating within the operation a fuel gas containing nitrogen and methane wherein the amount of nitrogen present is at least about 50% of the said fuel gas, and
(d) Utilizing said fuel gas as a combustion gas according to step (a).

8. A method according to claim 7 wherein the fuel gas is recovered by a partial evaporation of liquid product obtained when separating a gaseous helium concentrate from the refrigerated and expanded gases in the system.

9. A method according to claim 8 wherein the fuel gas is at least in part obtained by controlling the amount of liquid natural gas, obtained by condensing the same in the operation, which is evaporated to produce a nitrogen-methane vapor of a composition optimum for a gas turbine under its conditions of operation.

10. A method according to claim 7 wherein the fuel gas is obtained by first refrigerating under pressure to remove natural gas liquids from the gases, further refrigerating the remaining gases under pressure and removing a substantial portion of liquid methane therefrom together with nitrogen, and partially evaporating said liquid methane and nitrogen to obtain said fuel gas.

11. A method according to claim 10 wherein at least a portion of said fuel gas is obtained by further refrigerating the gases, from which the liquid methane, together with nitrogen has been removed, to obtain a helium gas concentrate, containing nitrogen and only a minor portion of hydrocarbon and obtaining a liquid which is vaporized to provide at least a portion of said fuel.

12. A method according to claim 10 wherein the further refrigerated gas which is obtained after separation of natural gas liquids is expanded to a lower pressure prior to obtaining said substantial portion of liquid methane together with nitrogen, which portion is then partially evaporated to provide said portion of fuel gas.

13. A method according to claim 7 wherein the crude helium product which is obtained by removing by refrigeration and expansion the major portion of the hydrocarbon from the natural gas is partially condensed to provide said fuel gas, which fuel gas contains a large preponderance of nitrogen, the remainder being essentially methane.

14. A method for the recovery of helium from natural gas which comprises the following sequence of steps:
(1) refrigerating under pressure, a natural gas feed containing helium, nitrogen, methane, and heavier hydrocarbons;
(2) removing from the refrigerated gas as a liquid a portion of methane and a substantial portion of hydrocarbons heavier than methane;
(3) heat exchanging said hydrocarbons heavier than methane with incoming feed;
(4) further refrigerating the still uncondensed gases thus obtained;
(5) expanding the further refrigerated gases to a lower pressure, obtaining a liquid containing a large, preponderant proportion of methane and a small percentage of higher boiling hydrocarbons and yet uncondensed gases;
(6) separating the last obtained liquid from the refrigerated gas;
(7) heat exchanging said last separated, last obtained liquid with said still uncondensed gases and then with incoming feed;

(8) further refrigerating said gases;
(9) expanding said further refrigerated gases, obtaining a liquid phase containing nitrogen, methane, and a very small percentage of higher boiling hydrocarbon and a gas phase containing helium, nitrogen, and a very small percentage of methane;
(10) separating said liquid phase from said gas phase;
(11) heat exchanging said gas phase with said yet uncondensed gases, then with said still uncondensed gases and then with incoming feed;
(12) recovering the thus used, last mentioned gas phase as a helium concentrate product of the method, and
(13) heat exchanging the last obtained liquid phase with the yet uncondensed gases, obtaining from said liquid phase a gas phase containing at least about 50 percent nitrogen and up to about 50 percent methane and useful in the method as a fuel, and a remaining liquid phase, separating said last obtained gas phase from said remaining liquid phase, heat exchanging said last separated gas phase with said yet uncondensed gases and before said yet uncondensed gases are heat exchanged with said last obtained liquid phase first mentioned in this claim, then heat exchanging said last separated gas phase with said still uncondensed gases and then with incoming feed and recovering said last separated gas phase as said fuel, utilizing said fuel as a combustible containing a large proportion of non-combustible gas for powering an internal combustion power plant to power the operation, whereby the said non-combustible gas also serves to prevent overheating of the said power plant.

15. A method according to claim 14 wherein said remaining liquid phase is heat exchanged with said yet uncondensed gases before said last mentioned gases are heat exchanged with said last obtained liquid phase first mentioned in claim 14, then with said still uncondensed gases and then with incoming feed.

References Cited by the Examiner
UNITED STATES PATENTS

| | | | |
|---|---|---|---|
| 1,040,886 | 10/12 | Claude | 63—23 |
| 1,530,461 | 3/25 | Graham | 62—23 |
| 1,664,412 | 4/28 | Haynes. | |
| 1,676,225 | 7/28 | Tolman | 62—22 X |
| 1,773,012 | 8/30 | Schuftan. | |
| 1,821,540 | 9/31 | Bottoms. | |
| 1,876,551 | 9/32 | Barstow | 62—23 |
| 1,913,805 | 6/33 | Hausen | 62—23 X |
| 2,122,238 | 6/38 | Pollitzer. | |
| 2,146,197 | 2/39 | Twomey | 62—40 X |
| 2,284,662 | 6/42 | Kahle | 62—40 X |
| 2,591,658 | 4/52 | Haringhuizen. | |
| 2,595,284 | 5/52 | Mullins. | |
| 2,600,133 | 6/52 | Simms | 62—17 X |
| 2,677,945 | 5/54 | Miller | 62—39 X |
| 2,679,145 | 5/54 | Hagen. | |
| 2,887,850 | 5/59 | Adams | 62—17 |
| 2,915,881 | 12/59 | Irvine | 62—17 |
| 2,940,271 | 6/60 | Jackson | 62—23 X |

FOREIGN PATENTS

| | | |
|---|---|---|
| 864,855 | 4/61 | Great Britain. |
| 1,149,663 | 7/57 | France. |

NORMAN YUDKOFF, *Primary Examiner.*

ROBERT A. O'LEARY, *Examiner.*